United States Patent
Baas

[11] Patent Number: 5,867,461
[45] Date of Patent: Feb. 2, 1999

[54] OPTICAL RECORDING AND REPRODUCING APPARATUS WITH SERVO COMPENSATION FOR DETECTED DEFECTS AND EXTERNAL SHOCKS

[75] Inventor: Dieter Baas, Kehl-Auenheim, Germany

[73] Assignee: Deutsche Thomson-Brandt GmbH, Villingen-Schwenningen, Germany

[21] Appl. No.: 97,697

[22] Filed: Jul. 27, 1993

Related U.S. Application Data

[63] Continuation of PCT/EP92/00229, Feb. 4, 1992.

[30] Foreign Application Priority Data

Feb. 9, 1991 [DE] Germany ............................ 41 03 974

[51] Int. Cl.$^6$ .................................................. G11B 7/095
[52] U.S. Cl. ................................ 369/44.32; 369/44.34; 369/44.35; 369/54; 369/58
[58] Field of Search ................................ 369/44.32, 54, 369/58, 44.28, 44.34, 44.35; 360/77.04

[56] References Cited

U.S. PATENT DOCUMENTS

| | | |
|---|---|---|
| 4,682,314 | 7/1987 | Nakagaki et al. . |
| 4,703,468 | 10/1987 | Baba et al. . |
| 4,785,442 | 11/1988 | Ontake et al. .................... 369/44.32 X |
| 5,241,433 | 8/1993 | Anderson et al. ................... 360/77.04 |

FOREIGN PATENT DOCUMENTS

| | | |
|---|---|---|
| 254 748 | 2/1988 | European Pat. Off. . |
| 403 196 | 12/1990 | European Pat. Off. . |

OTHER PUBLICATIONS

Patent Abstracts of Japan, vol. 10, No. 300, P506, abstract of JP 61–117738, Oct. 14, 1986.

Patent Abstracts of Japan, vol. 9, No. 327, P 415, abstract of JP 60–151846, Dec. 21, 1985.

*Primary Examiner*—W. R. Young
*Attorney, Agent, or Firm*—Joseph S. Tripoli; Eric P. Herrmann; Ronald H. Kurdyla

[57] ABSTRACT

An optical recording and/or playback system having tracking and focus regulating circuits. Mechanical shock and/or disc defects are detected and the adverse effects on the tracking and focus regulating circuits are reduced.

18 Claims, 3 Drawing Sheets

OPTICAL RECORDING AND REPRODUCING APPARATUS WITH SERVO COMPENSATION FOR DETECTED DEFECTS AND EXTERNAL SHOCKS

BACKGROUND OF THE INVENTION

This is a continuation of PCT/EP92/00229 filed Feb. 4, 1992. The present invention relates to optical recording and/or playback devices and more particularly to apparatus for reducing the effects of mechanical shock and disc defects on data reproduction and/or recording.

DESCRIPTION OF THE PRIOR ART

Optical recording and/or playback devices are used for recording and/or reproducing items of information on a disc-type recording medium. The disc-type recording mediums, such as compact discs (CDs), have depressions in spiral tracks that represent the items of information or data items stored on the CD. These depressions are implanted on or in the CD. Reproduction of this stored information is accomplished by rotating the CD and scanning it with a light beam.

The light beam is focused onto the rotating recording medium by means of a focusing regulation circuit. The light beam is guided along the spiral data tracks of the rotating recording medium by means of a tracking regulation circuit. Focusing and tracking regulation circuits found in a CD player or other optical recording/playback devices are generically referred to as servo circuits. The regulating signal of the focusing and/or tracking regulation circuit is supplied to an actuator of the respective servo circuit. Additionally, the regulating signal may be stored in memory.

These servo circuits typically function very reliably when the disc-type recording medium (i.e. CD) is free of defects. However, defects are often present on the disc-type recording medium in the form of scratches, holes in the reflective layer (called black dots), dust, or fingerprints. Such defects may corrupt either the regulating signal for the focusing regulation circuit (focusing error signal), the regulating signal for the tracking regulation circuit (tracking error signal) or both regulating signals. This corruption may result in the inability of the light beam to be focused onto the disc or guided along the data tracks.

In some known systems which include memory to store a sampled regulating signal, when a disturbance is detected, the regulating signal stored in the memory is substituted for the current or real-time regulating signal for the duration of a disturbance. In a particular optical recording and/or playback device described in published European Patent application EP-A 0 403 196 provision is made to store the tracking error signals and the focusing error signals for a specified time by means of several sample-and-hold elements. If faults appear in the focusing or tracking error signal, then the current focusing or tracking error signal is not sent to the actuator of the respective servo circuit. Instead, the stored focusing or tracking error signal is sent.

In published Japanese patent application JP-A 61-117738, an optical recording and/or playback device includes provision for detecting disc defects. If defects on the optical disc are detected, then the last valid focusing error signal prior to reaching the location of the defect is used to replace the current focusing error signal. This substitute signal is then sent to the actuator of the focusing regulation circuit.

Similarly, published Japanese patent application JP-A 60-151846 discloses an optical playback device which detects defects such as cracks, scratches or dust on the disc. In subsequent scans of the disc, if the light beam scanning the data encounters a detectable defective or contaminated point on the disc, the current tracking error signal is not supplied to the actuator of the tracking regulation circuit. Instead, the last valid tracking error signal before reaching the faulty point is supplied.

SUMMARY OF THE INVENTION

The present invention aims to prevent servo circuits from failing when disturbances such as defects associated with the disc-type recording medium or mechanical shocks occur. In this invention, the regulating signal for the focusing and/or tracking regulation circuit is stored for at least the last respective rotation of the rotating recording medium prior to the disturbance. Upon encountering a disturbance, the apparatus will supply the stored focusing and/or tracking regulation signal to the actuator. The apparatus assumes a disturbance has occurred whenever a shock (impact) sensor detects a mechanical shock to the recording and/or playback device. In addition, disturbances are assumed when the data signal, focusing regulation signal, or tracking regulation signal deviates beyond a predetermined range.

Figure 3:
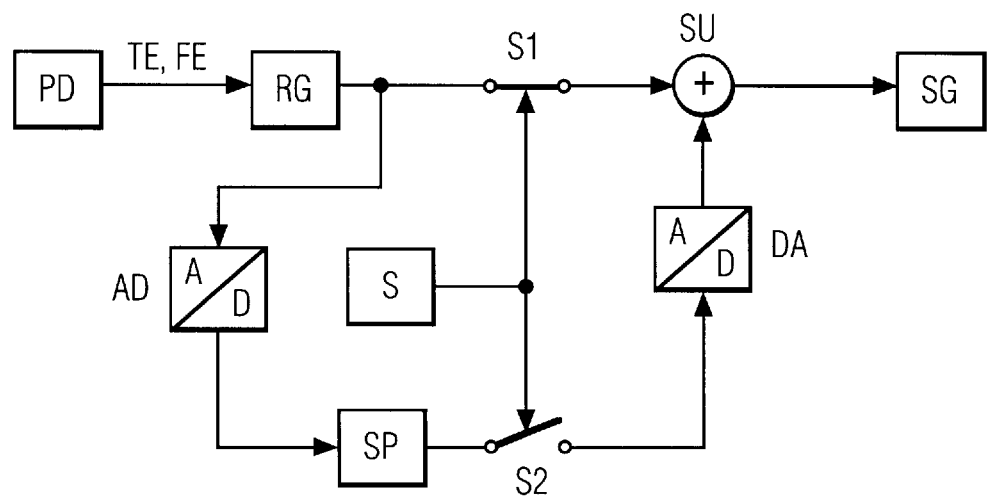
FIG. 3 is a block diagram of a third exemplary embodiment of an optical recording and/or playback data recovery apparatus embodying the present invention.

Referring first to FIG. 3, a first embodiment of the present invention is illustrated. A focusing error signal FE or a tracking error signal TE is generated by conventional means from a reflected scanning light spot detected by a photodetector PD. The FE or TE signal is applied to a regulator RG. A regulating signal output by the regulator RG is coupled by a controllable switch S1 to a summation point SU. If switch S1 is closed, the regulating signal is supplied to an actuator SG of the servo circuit which controls the tracking and/or focusing device.

An analog-to-digital converter AD is coupled to regulator RG. The analog-to-digital converter AD converts the FE or TE signal to digital or binary form, samples of which are successively stored in memory SP. Samples of the regulating signal for the last revolution or last n revolutions are stored in the memory SP. The stored regulating signal from the memory SP is coupled to a digital-to-analog converter DA by a switch S2. The digital-to-analog converter DA supplies an analog version of the stored regulating signal to the summation point SU.

The switches S1 and S2 are each closed to the mutual exclusion of the other. Therefore, the actuator SG may receive only the current regulating signal through switch S1 or the stored regulating signal through switch S2. The switches S1 and S2 are controlled by a shock sensor S. The shock sensor, S detects mechanical shocks to the recording and/or playback device.

Normally, switch S1 is closed and S2 is open, thereby coupling the regulating signal, provided by the regulator RG, to the actuator SG of the servo circuit. If, however, the shock sensor S detects a mechanical impact to the recording and/or playback device, then its output signal opens switch S1 and closes switch S2. The stored regulating signal is applied to the actuator SG of the servo circuit. Therefore, since the actuator SG receives a regulating signal which, although not current, is uncorrupted, failures in the servo circuit are substantially avoided. During the disturbance, however, the servo circuit no longer functions in real time.

If the effect of the mechanical impact wanes, the shock sensor output signal recloses switch S1 and simultaneously opens switch S2. The real-time regulating signal is again applied to the actuator SG of the servo circuit.

Figure 1:
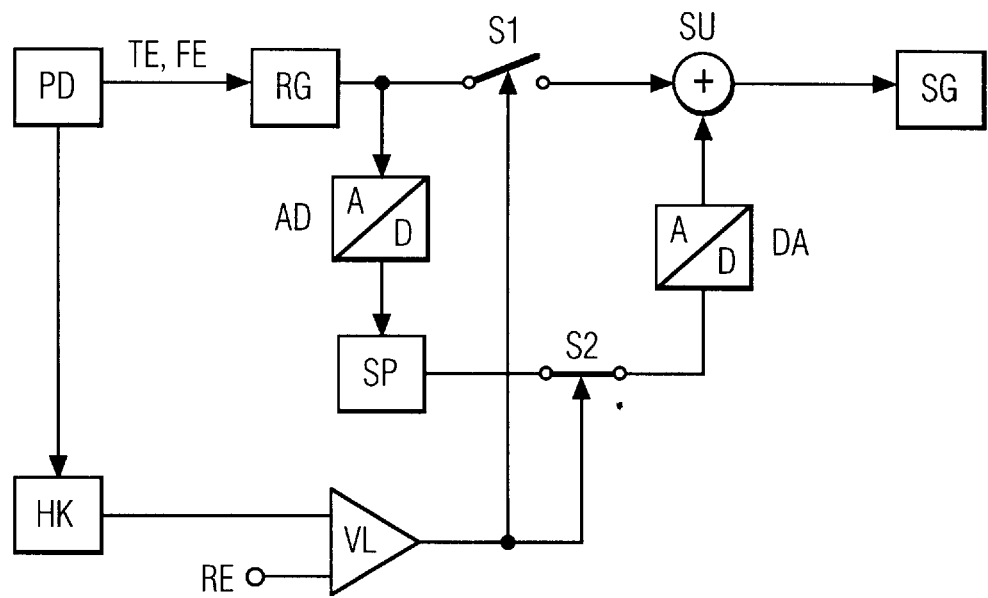
FIG. 1 is a block diagram of an optical recording and/or playback data recovery apparatus embodying the present invention.

An additional embodiment of the present invention is illustrated in FIG. 1. A waveform diagram shown in FIG. 4 will aid in the explanation of the FIG. 1 apparatus. In addition to detection of a disturbance by means of a shock sensor S, a disturbance may also be recognized by analysis of the upper and lower generating curves (envelopes) of the information signal HF recovered from the disc.

Figure 4:
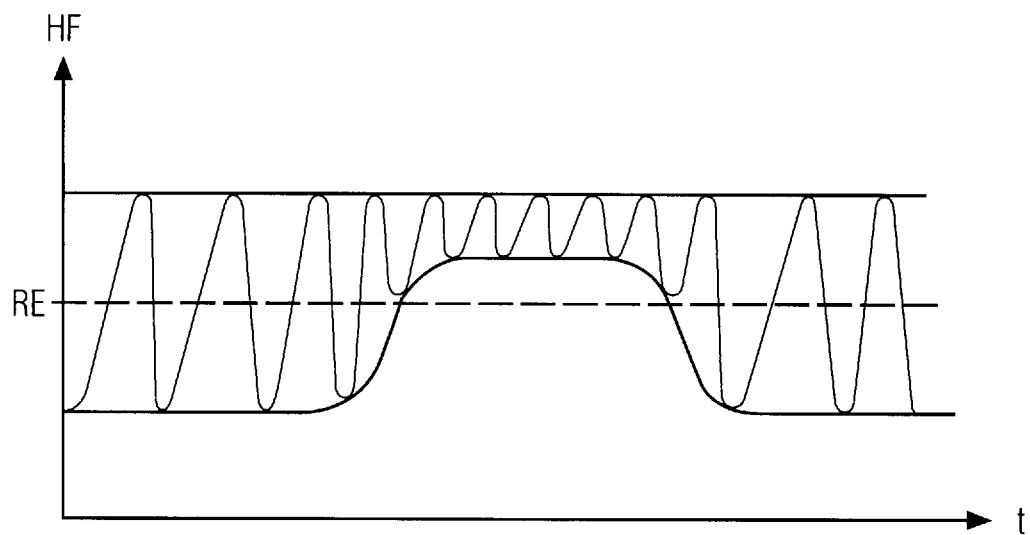
FIG. 4 is a waveform diagram illustrating data signals and a reference signal used in the FIG. 1 embodiment.

The data signal HF, generated by the photodetector PD or another photodetector, is applied to the input of a circuit arrangement HK. Circuit arrangement HK generates the lower envelope of the data signal HF, which envelope is illustrated in FIG. 4. Such a circuit arrangement is known (See, e.g., DE-OS 37 19 489). The output of the circuit arrangement HK is connected to a first input of a comparator VL. A reference variable RE is applied to the comparator's VL second input. The comparator VL produces a signal to control switches S1 and S2.

In trouble-free operation, the upper and lower envelopes of the data signal HF, illustrated in FIG. 4, are straight lines. Switch S1 is closed and switch S2 is open. As a result, the regulator RG supplies the current regulating signal to the actuator SG of the servo circuit.

When the light beam scans a point on the disc which appears damaged (i.e. scratches, holes, or contamination), the data signal HF deviates from the straight line, beyond a predetermined reference value. The lower envelope exhibits a bulge upwards in response to a data signal HF amplitude decrease. When the lower envelope exceeds the reference value RE, the comparator VL outputs a signal indicating a defect on the rotating recording medium. This signal is designed to open switch S1 and close switch S2. The regulating signal from regulator RG is no longer fed to the actuator SG, but rather, the regulating signal stored in the memory SP is. The actuator SG receives the stored regulating signal which, although not current, is uncorrupted. Consequently, failures in the servo circuit as a result of scratches, holes or contamination on the disc, are almost completely avoided. During the disturbance, however, the servo circuit no longer functions in real time.

When the light beam scans undamaged areas on the disc, the amplitudes of the data signal HF increase again. As a result, the lower envelope returns to a relatively straight line waveform. Once the level of the lower envelope drops below the reference value RE, the comparator VL closes the switch S1 while simultaneously opening the switch S2. The current regulating signal supplied by the regulator RG is fed to the actuator SG. Accordingly, the regulating circuit functions in real time.

Figure 2:
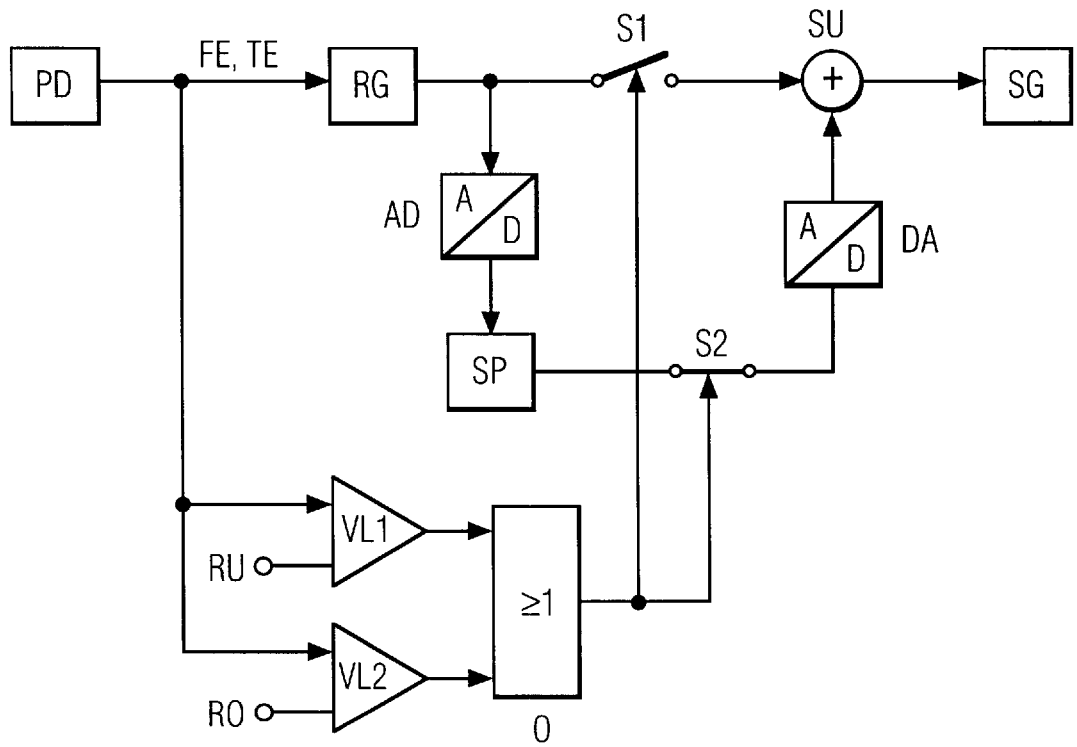
FIG. 2 is a block diagram of a second exemplary embodiment of an optical recording and/or playback data recovery apparatus embodying the present invention.

FIG. 2 illustrates another embodiment of the present invention.

Figure 5:
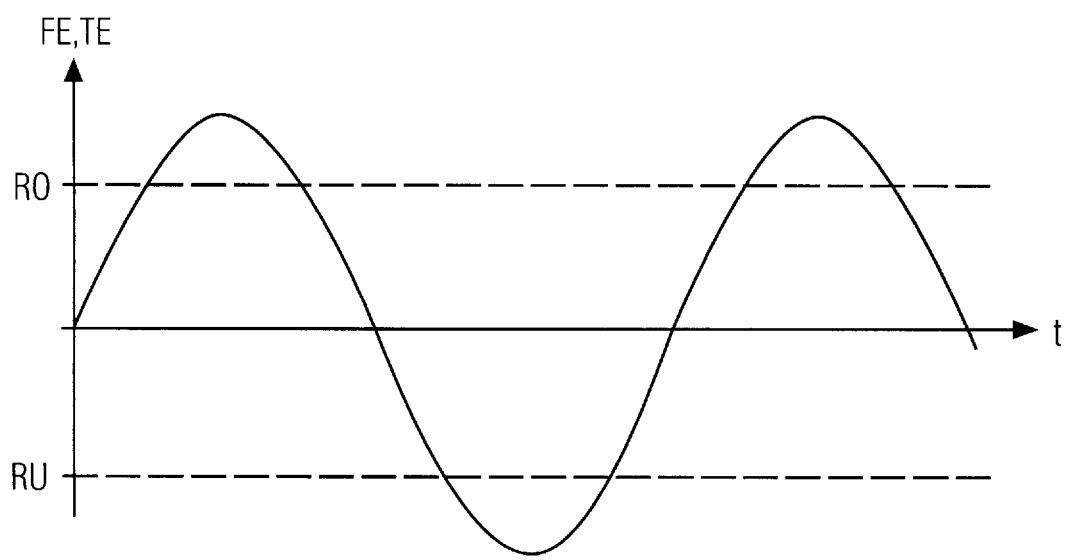
FIG. 5 is a waveform diagram illustrating a regulating signal and upper and lower reference signals used in the FIG. 2 embodiment.

FIG. 5 will aid in the understanding of the apparatus described in FIG. 2. In addition to the signal from the shock sensor S, the level of the tracking and focusing error signal may be evaluated in order to detect a disturbance.

In FIG. 2 the focusing error signal FE or the tracking error signal TE is coupled to a first input of a comparator VL1 and a first input of a comparator VL2. A lower reference value RU is applied to the second input of the comparator VL1. An upper reference value RO is applied to the second input of the comparator VL2. The signal FE or TE is then compared to the lower reference value RU and simultaneously to the upper reference value RO.

The regulating signal has a sinusoidal waveshape, as is shown in FIG. 5. If the regulating signal exceeds the upper reference value RO, the comparator VL2 produces a signal indicative of this condition to the OR gate O. Similarly, if the regulating signal drops below the lower reference value RU, the comparator VL1 produces a signal indicative of this condition to the OR gate O. As a result, if the applied error signal (FE or TE) falls outside the predetermined range defined by RO and RU, the OR gate O will generate a signal which will open switch S1 and close switch S2. Accordingly, the actuator SG will receive the regulating signal stored in memory SP.

As soon as the disturbance abates, the regulating signal will return to values within the predetermined range. The comparators VL1 and VL2 and the OR gate will then generate a control signal indicating the absence of defects on the rotating recording medium. This control signal will cause the switch S1 to close while opening the switch S2. The servo circuit will receive the current regulating signal resulting in the real time scanning of data.

Finally, the three exemplary embodiments illustrated in the FIGS. 1, 2 and 3 may be combined with each other in any way. One such way would connect the outputs of the comparators and shock sensor to the inputs of an OR gate, the output signal of which controls the switches S1 and S2. Additionally, those skilled in the art will readily realize that the regulating signal FE or TE may be stored in memory and the regulator RG may be arranged to follow summation point SU.

The invention is suitable for both optical playback devices such as CD players and video disc players, as well as for optical recording and playback devices. Examples of recording and playback devices might be DRAW disc players and magneto-optical devices.

What is claimed is:

1. In a data recovery apparatus having a light beam which is focused onto a rotating recording medium by a regulation circuit and is guided along data tracks of the rotating recording medium by a tracking regulation circuit, where a regulating signal of a regulation circuit is stored in a memory and the regulating signal present in the memory is applied to an actuator of the regulation circuit for the duration of a disturbance, improvements comprising:

means for successively storing regulating signal values, at predetermined intervals, in memory for at least the last most prior one rotation of the rotating recording medium;

means for detecting mechanical shock incurred by the apparatus; and means for substituting the regulating signal stored in memory for the regulating signal in response to detecting said mechanical shock.

2. The apparatus set forth in claim 1 wherein said means for substituting, substitutes for the current regulating signal, a corresponding regulating signal from said prior rotation of the rotating recording medium which is stored in memory, in response to detecting said mechanical shock.

3. The apparatus set forth in claim 2 further comprising:

means for detecting defects on the rotating recording medium when the level of a data signal drops below a predeterminable threshold value; and means for substituting for the current regulating signal, a corresponding regulating signal from said prior rotation of the rotating recording medium which is stored in memory, in response to detecting said defects on the rotating recording medium.

4. The apparatus set forth in claim 3 wherein said means for detecting defects on the rotating recording medium further comprises detecting when a data signal from the rotating recording medium and the regulating signal deviates from predetermined threshold values.

5. The apparatus set forth in claim 3 comprising:

a regulator responsive to signals derived from said rotating recording medium, having an output terminal for providing a regulating signal to control one of a focusing and tracking device;

a memory coupled to said regulator for selectively storing values of said regulating signal at predetermined intervals, for at least the last most prior one rotation of the rotating recording medium; and having an output terminal for providing said stored regulating signal;

means for generating an envelope of a data signal read from the rotating recording medium, comparing said envelope of the data signal to a predetermined reference value and generating a signal which indicates if defects exist on the rotating recording medium when said envelope surpasses said reference value; and switch means, responsive to said signal indicative of rotating recording medium defects, for substituting for the current regulating signal, a corresponding regulating signal from said prior rotation of the rotating recording medium which is stored in memory, to control one of said focusing and tracking device when rotating recording medium defects are detected, and for coupling said regulating signal from the output terminal of said regulator to control one of said focusing and tracking devices otherwise.

6. The apparatus set forth in claim 2 further comprising:

means for detecting defects on the rotating recording medium when the regulating signal of the regulation circuit exhibits one of exceeding a predeterminable upper threshold value and dropping below a predeterminable lower threshold value; and means for substituting for the current regulating signal, a corresponding regulating signal from said prior rotation of the rotating recording medium which is stored in memory, in response to detecting said defects on the rotating recording medium.

7. The apparatus set forth in claim 6 wherein said means for detecting defects on the rotating recording medium further comprises a comparator coupled to the regulating signal for comparison to predetermined threshold range values which indicate defects exist on the rotating recording medium and supplying a signal indicative of defects on the rotating recording medium.

8. The apparatus set forth in claim 6 wherein said means for detecting defects on the rotating recording medium further comprises detecting when a data signal from the rotating recording medium and the regulating signal deviates from predetermined threshold values.

9. The apparatus set forth in claim 1 further comprising:

means for detecting defects on the rotating recording medium when the level of a data signal drops below a predeterminable threshold value; and means for substituting for the current regulating signal, a corresponding regulating signal from said prior rotation of the rotating recording medium which is stored in memory, in response to detecting said defects on the rotating recording medium.

10. The apparatus set forth in claim 9 wherein said means for detecting defects on the rotating recording medium further comprises detecting when a data signal from the rotating recording medium and the regulating signal deviates from predetermined threshold values.

11. The apparatus set forth in claim 9 comprising:

a regulator responsive to signals derived from said rotating recording medium, having an output terminal for providing a regulating signal to control one of a focusing and tracking device;

a memory coupled to said regulator for selectively storing values of said regulating signal at predetermined intervals, for at least the last most prior one rotation of the rotating recording medium; and having an output terminal for providing said stored regulating signal;

means for generating an envelope of a data signal read from the rotating recording medium, comparing said envelope of the data signal to a predetermined reference value and generating a signal which indicates if defects exist on the rotating recording medium when said envelope surpasses said reference value; and switch means, responsive to said signal indicative of mechanical shocks, for substituting for the current regulating signal, a corresponding regulating signal from said prior rotation of the rotating recording medium which is stored in memory, to control one of said focusing and tracking device when mechanical shocks are detected, and for coupling said regulating signal from the output terminal of said regulator to control one of said focusing and tracking devices otherwise.

12. The apparatus set forth in claim 1 further comprising:

means for detecting defects on the rotating recording medium when the regulating signal of the regulation circuit exhibits one of exceeding a predeterminable upper threshold value and dropping below a predeterminable lower threshold value; and means for substituting for the current regulating signal, a corresponding regulating signal from said prior rotation of the rotating recording medium which is stored in memory, in response to detecting said defects on the rotating recording medium.

13. The apparatus set forth in claim 12 wherein said means for detecting defects on the rotating recording medium further comprises a comparator coupled to the regulating signal for comparison to predetermined threshold range values which indicate defects exist on the rotating recording medium and supplying a signal indicative of defects on the rotating recording medium.

14. The apparatus set forth in claim 12 wherein said means for detecting defects on the rotating recording medium further comprises detecting when a data signal from the rotating recording medium and the regulating signal deviates from predetermined threshold values.

15. The apparatus set forth in claim 12 comprising:

a regulator responsive to signals derived from said rotating recording medium, having an output terminal for providing a regulating signal to control one of a focusing and tracking device;

a memory coupled to said regulator for selectively storing values of said regulating signal at predetermined intervals, for at least the last most prior one rotation of the rotating recording medium; and having an output terminal for providing said stored regulating signal;

comparator means responsive to said regulating signal for determining if said regulating signal deviates outside a predetermined range of values and generating a signal which indicates if defects exist on the rotating recording medium; and switch means, responsive to said signal indicative of rotating recording medium defects, for substituting for the current regulating signal, a corresponding regulating signal from said prior rotation of the rotating recording medium which is stored in memory, to control one of said focusing and tracking device when rotating recording medium defects are detected, and for coupling said regulating signal from the output terminal of said regulator to control one of said focusing and tracking devices otherwise.

16. The apparatus set forth in claim 1 comprising:

a regulator responsive to signals derived from said rotating recording medium, having an output terminal for providing a regulating signal to control one of a focusing and tracking device;

a memory coupled to said regulator for selectively storing values of said regulating signal at predetermined intervals, for at least the last most prior one rotation of the rotating recording medium; and having an output terminal for providing said stored regulating signal;

a shock sensor for generating a signal indicative of mechanical shocks incurred by said recovery apparatus; and switch means, responsive to said signal indicative of mechanical shocks, for substituting for the current regulating signal, a corresponding regulating signal from said prior rotation of the rotating recording medium which is stored in memory, to control one of said focusing and tracking device when mechanical shocks are detected, and for coupling said regulating signal from the output terminal of said regulator to control one of said focusing and tracking devices otherwise.

17. The apparatus set forth in claim 1 further comprising:

comparator means responsive to said regulating signal for determining if said regulating signal deviates outside a predetermined range of values and generating a signal which indicates such deviations; and switch means, responsive to said signal indicative of deviations or said means for detecting mechanical shock incurred by the apparatus, for substituting the regulating signal stored in memory for the regulating signal, in response to detecting said mechanical shock or said signal deviating outside said predetermined range.

18. The apparatus set forth in claim 1 further comprising:

means for generating an envelope of a data signal read from the rotating recording medium, comparing said envelope of the data signal to a predetermined reference value and generating a signal which indicates when said envelope surpasses said reference value; and switch means, responsive to said signal indicative of said envelope surpassing said reference value or said means for detecting mechanical shock incurred by the apparatus, for substituting the regulating signal stored in memory for the regulating signal, in response to detecting said mechanical shock or said envelope surpassing said reference value.

\* \* \* \* \*